(12) United States Patent
Porzio et al.

(10) Patent No.: US 7,705,081 B2
(45) Date of Patent: Apr. 27, 2010

(54) LOW-VOC EMULSION POLYMER COATING COMPOSITIONS

(75) Inventors: Robert Shane Porzio, Akron, OH (US); Cheng-Le Zhao, Charlotte, NC (US); Michael J. Anchor, Canton, MI (US)

(73) Assignee: BASF SE (DE)

( * ) Notice: Subject to any disclaimer, the term of this patent is extended or adjusted under 35 U.S.C. 154(b) by 442 days.

(21) Appl. No.: 11/112,801

(22) Filed: Apr. 22, 2005

(65) Prior Publication Data

US 2006/0241230 A1    Oct. 26, 2006

(51) Int. Cl.
*C08K 3/26*    (2006.01)
(52) U.S. Cl. .................. 524/425; 524/431; 524/445; 524/451; 524/556
(58) Field of Classification Search .......... 524/425, 524/261, 376, 377, 426.1, 431, 432, 445, 524/451, 556
See application file for complete search history.

(56) References Cited

U.S. PATENT DOCUMENTS

| | | | | |
|---|---|---|---|---|
| 3,023,177 | A | * | 2/1962 | Boucher ................ 524/513 |
| 4,111,881 | A | * | 9/1978 | Paul .................... 524/378 |
| 4,127,549 | A | | 11/1978 | Churchill et al. |
| 5,605,949 | A | * | 2/1997 | Anchor et al. .......... 524/261 |
| 5,610,225 | A | | 3/1997 | Farwaha et al. |
| 6,028,139 | A | | 2/2000 | Farwaha et al. |
| 6,087,437 | A | | 7/2000 | Farwaha et al. |
| 6,582,510 | B1 | * | 6/2003 | Schwartz ................ 106/499 |
| 6,933,415 | B2 | * | 8/2005 | Zhao et al. .............. 568/616 |
| 2003/0229171 | A1 | * | 12/2003 | Zhao et al. .............. 524/425 |
| 2006/0052502 | A1 | | 3/2006 | Zhao et al. |
| 2007/0105982 | A1 | | 5/2007 | Roschmann et al. |

FOREIGN PATENT DOCUMENTS

SU    899614 B  *  1/1982

OTHER PUBLICATIONS

Bosen et al. "Antifreezes", Ullman's Encyclopedia of Industrial Chemistry, vol. A3, 5$^{th}$ Edition, VCH Verlag pp. 23-31 (1985).
Cockbain, E.G., et al. "Freeze-resistant Natural Rubber Latex Concentrate", Proceedings of Natural Rubber Conference Kuala Lumpur 1968, Part II, pp. 409-422.
International Search Report, PCT/US2006/000150, mailed May 10, 2006.
U.S. Appl. No. 11/912,289, Porzio et al.

* cited by examiner

*Primary Examiner*—Ling-Siu Choi
*Assistant Examiner*—Michael M Bernshteyn
(74) *Attorney, Agent, or Firm*—Fish & Richardson P.C.

(57) ABSTRACT

An aqueous latex coating composition and method of making an aqueous latex coating composition that comprises at least one oligomeric ethylene glycol derivative having the structure RO—(CH$_2$—CH$_2$—O—)$_n$—H, at least one latex polymer, and water, wherein R is H or C$_1$-C$_4$ alkyl and preferably H, and n is from 3 to 9, preferably from 3 to 8, and more preferably from 3 to 6. The oligomeric ethylene glycol derivative functions as both a coalescing solvent and freeze-thaw stabilizer without contributing to the VOC content of the composition.

39 Claims, No Drawings

LOW-VOC EMULSION POLYMER COATING COMPOSITIONS

FIELD OF THE INVENTION

The present invention relates to the use of ethylene glycol-based additives to reduce the Volatile Organic Compound (VOC) content of aqueous coating compositions such as paint and other coating compositions while maintaining the freeze-thaw stability and scrub resistance of these compositions. In particular, the present invention relates to the use of certain ethylene glycol derivatives in place of VOC solvents to reduce the VOC content of aqueous coating compositions while maintaining the freeze-thaw stability and scrub resistance of these compositions.

BACKGROUND OF THE INVENTION

Aqueous latex coating compositions, such as latex paints, are used for a variety of applications, typically for the decoration or protection of surfaces. The latex coating compositions contain latex binders, typically emulsion polymers, maintained in liquid solvents. Upon application of the coating materials, the solvents evaporate and the binders harden into a mechanically rigid state while binding pigments, fillers, and other additives.

Several types of additives may be added to the latex coating compositions to improve their performance. For instance, latex compositions are often unstable at low temperature and when exposed to cycles of freezing and thawing. Ethylene glycol and propylene glycol are often used as anti-freeze additives to prevent the composition from freezing and to improve performance of the composition at low temperatures.

Additionally, coalescing solvents are often used as additives to lower the minimum film forming temperature (MFFT) of the composition, which allows the coating to be applied at lower temperature. Exemplary coalescing solvents include 2,2,4-trimethyl-1,3-pentanediol monoisobutyrate and 2-ethylhexyl benzoate. The coalescing solvents also affect the scrub resistance, i.e. durability, and blocking resistance, i.e. hardness, of the resultant coating.

Many of the additives used as coalescing agents and anti-freeze agents are effective for their purposes but are becoming less and less desirable because they are VOC's. After application of the latex composition to a substrate, the VOC's slowly evaporate into the surroundings. As permissible VOC levels continue to decrease as a result of increased environmental regulations, a need has developed in the art to produce latex compositions with lower VOC levels. However, there is also a need to maintain the performance of latex compositions even at these lower VOC levels.

Furthermore, the goal of achieving good coalescing properties, evidenced by good scrub resistance, has long been considered antagonistic to the goal of achieving good freeze-thaw stability, particularly in the absence of VOC solvent additives. Scrub resistance generally worsens as the MFFT of the latex increases and approaches the ambient curing temperature. Coalescing solvents, typically VOC's, have conventionally been added to lower the MFFT of coating compositions to improve the low temperature coalescence properties of the compositions. However, as the MFFT of an emulsion polymer is reduced, the freeze-thaw stability of the composition diminishes. Poor freeze-thaw resistance has traditionally been offset by the addition of ethylene or propylene glycol, each considered to be a VOC, which act as anti-freeze in the compositions. Thus, in the past, production of latex coating compositions having improved scrub resistance and freeze-thaw stability has required the addition of various VOC solvents.

Recent attempts to eliminate VOC's while maintaining acceptable coating performance have focused on modification of the latex binder to make it capable of coalescing in the absence of a coalescent additive. However, modification of the binder polymer tends to reduce at least one of low temperature coalescence, freeze-thaw resistance, or scrub resistance of the resulting coating compared to otherwise similar unmodified polymers applied with VOC additives.

It is, therefore, desired to produce an aqueous latex coating composition with reduced or no VOC content without reduction in coalescence, freeze-thaw stability, or scrub resistance, and without required modification of the latex binder.

SUMMARY OF THE INVENTION

The present invention provides an aqueous latex coating composition that comprises an oligomeric additive which functions as both a coalescing solvent and freeze-thaw stabilizer without elevating the VOC content of the composition. The composition provides coatings of commercially acceptable properties while substantially reducing or eliminating the need for VOC's within the coating composition. The coating composition advantageously comprises less than 250 g/l of VOC's, and more advantageously comprises no substantial content of VOC's. Thus, aqueous coating compositions can be produced that possess lower VOC levels than conventional aqueous coating compositions and that are more environmentally desirable than conventional latex coatings.

The coating composition comprises at least one oligomeric ethylene glycol derivative, at least one latex binder, and water. The composition may also contain a number of additives as discussed in further detail below.

The at least one oligomeric ethylene glycol derivative of the coating composition has the structure:

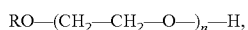

$$\mathrm{RO-(CH_2-CH_2-O-)_n-H},$$

wherein R is H or $C_1$-$C_4$ alkyl and preferably H; and n is from 3 to 9, preferably from 3 to 8, and more preferably from 3 to 6. If there are a plurality of oligomeric ethylene glycol derivatives having varying values for n, preferably the average value for n is within the range claimed above and more preferably all or substantially all of the oligomeric ethylene glycol derivatives included in the composition are within the ranges for n provided above.

The latex of the composition is advantageously an emulsion polymer, and may be selected from the group consisting of pure acrylics, styrene acrylics, vinyl acrylics and acrylated ethylene vinyl acetate copolymers, or derived from at least one acrylic monomer selected from the group consisting of acrylic acid, acrylic acid esters, methacrylic acid, and methacrylic acid esters, or further derived from one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, ethylene, and C4-C8 conjugated dienes.

According to one embodiment, the composition is a paint. To provide the paint, at least one inorganic pigment is added to the composition. Such pigment may advantageously be selected from the group consisting of $TiO_2$, clay, $CaCO_3$, talc, barytes, zinc oxide, zinc sulfite, and combinations thereof.

The composition may contain additional additives, as known in the art, to modify the characteristics of the latex composition as long as those additives do not increase the VOC content of the composition above the values contemplated by this disclosure. These additives may include one or more plasticizers, drying retarders, dispersants, surfactants or wetting agents, rheology modifiers, defoamers, thickeners, biocides, mildewcides, colorants, waxes, perfumes, or co-solvents.

According to another embodiment, the invention comprises a method of preparing an aqueous coating composition, comprising the step of preparing the polymer latex binder using emulsion polymerization and combining the binder with the ethylene glycol derivative to form an aqueous composition. Optionally, at least one pigment and other additives can be mixed with the resulting latex binder composition to produce the aqueous coating composition. Alternatively, the ethylene glycol derivatives of the invention can be used to replace the VOC solvents used in the traditional methods of preparing coating compositions.

According to another embodiment, the invention comprises a substrate coated with a dried coating composition, wherein the dried coating composition comprises at least one oligomeric ethylene glycol derivative and at least one latex binder. The dried coating composition may also contain a number of additives as discussed in further detail herein, but is substantially free of water or other solvents.

A coating composition has been invented in which freeze-thaw stability and low temperature coalescence are simultaneously maintained or enhanced. These results are obtained by utilizing a single non-VOC additive, which acts as both a coalescing solvent and freeze-thaw solvent. These and other features and advantages of the present invention will become more readily apparent to those skilled in the art upon consideration of the following detailed description, which describes the various embodiments of the invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments but includes numerous alternatives, modifications and equivalents as will become apparent from consideration of the following detailed description.

The present invention provides an aqueous latex coating composition that comprises an oligomeric ethylene glycol derivative that functions as both a coalescing solvent and freeze-thaw stabilizer. The ethylene glycol derivative is not classified as a volatile organic compound under EPA Test Method 24 and does not negatively affect the VOC content of the composition. Thus, a coating composition having favorable coalescing and freeze-thaw properties may be produced with little or no VOC content according to the invention. The composition contains at least one latex polymer, at least one of the specified ethylene glycol derivatives, and water. The composition may optionally contain pigments and other additives, but preferably has a VOC content of less than 250 g/l, and more preferably has a VOC content of less than 100 g/l, less than 50 g/l, or even substantially zero, i.e. less than 10 g/l, as determined using ASTM Method D3960.

The at least one latex polymer used in the aqueous coating composition may be selected from a wide variety of polymers as known in the art of latex coating compositions. For instance, the at least one latex may be derived from monomers comprising at least one acrylic monomer selected from the group consisting of acrylic acid, acrylic acid esters, methacrylic acid, and methacrylic acid esters. Alternatively, the latex polymer may include one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids (e.g. vinyl esters commercially available under the mark Veova® from Shell Chemical Company or sold as Exxar® Neo Vinyl Esters by ExxonMobil Chemical Company), itaconic acid, crotonic acid, maleic acid, fumaric acid, and ethylene. It is also possible to include C4-C8 conjugated dienes such as 1,3-butadiene, isoprene and chloroprene. Preferably, the monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate. The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The at least one oligomeric ethylene glycol derivative has the structure:

RO—(CH$_2$—CH$_2$—O—)$_n$—H, wherein R is H or C$_1$-C$_4$ alkyl and preferably H; and n is from 3 to 9, preferably from 3 to 8, and more preferably from 3 to 6. If there are a plurality of oligomeric ethylene glycol derivatives having varying values for n, preferably the average value for n is within the range claimed above and more preferably all or substantially all of the oligomeric ethylene glycol derivatives included in the composition are within the ranges for n provided above. The derivative is used as a separate component of the coating composition and is not incorporated into the polymeric structure of the latex binder. The oligomeric additive is advantageously present within the coating composition in an amount from about 1 wt % to about 10 wt %, more advantageously from 2 wt % to 8 wt %, and still more advantageously from 3 wt % to 7 wt %, based on the dry weight of the latex polymer.

The aqueous coating composition may include at least one pigment. The term "pigment" as used herein includes non-film-forming solids such as extenders and fillers. The at least one pigment is preferably selected from the group consisting of TiO$_2$ (in both anastase and rutile forms), clay (aluminum silicate), CaCO$_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks Minex® (oxides of silicon, aluminum, sodium and potassium commercially available from Unimin Specialty Minerals), Celites® (aluminum oxide and silicon dioxide commercially available from Celite Company), Atomites® (commercially available from English China Clay International), and Attagels® (commercially available from Engelhard). More preferably, the at least one pigment includes $TiO_2$, $CaCO_3$, or clay. Generally, the mean particle sizes of the pigments range from about 0.01 to about 50 microns. For example, the $TiO_2$ particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 50 percent by weight, more preferably from about 10 to about 40 percent by weight (i.e. the weight percentage of the pigment based on the total weight of the coating composition).

The coating composition can optionally contain conventional coating additives such as, for example, dispersants, additional surfactants (i.e. wetting agents), rheology modifiers, defoamers, thickeners, biocides, mildewcides, colorants such as colored pigments and dyes, waxes, perfumes, cosolvents, and the like. The optional additives may be used in a manner and amount as known in the art of conventional latex compositions, but the additives preferably do not increase the total VOC content of the composition above the preferred values provided herein.

The coating composition may include additional anti-freeze agents, such as ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). In addition, the coating composition may include additional coalescing solvents, such as 2,2,4-trimethyl-1,3-pentanediol monoisobutyrate (i.e. Texanol® commercially available from Eastman Chemical), 2-ethylhexyl benzoate (i.e. Velate® 378 commercially available from Vesicol Corporation), diethylene glycol and dipropylene glycol alkyl ethers. More preferably, the aqueous coating composition includes less than 1.0% or is substantially free (e.g. less than 0.1%) of additional anti-freeze agents and coalescing solvents. The additional anti-freeze agents and coalescing solvents when used do not increase the total VOC content of the composition above the preferred values provided herein.

The balance of the aqueous coating composition is water. Although much of the water is present in the polymer latex dispersion and in other components of the aqueous coating composition, water is generally also added separately to the aqueous coating composition. Typically, the aqueous coating composition includes from about 10% to about 85% by weight and more preferably from about 35% to about 80% by weight water. Stated differently, the total solids content of the aqueous coating composition is typically from about 15% to about 90%, more preferably, from about 20% to about 65%.

The coating compositions are typically formulated as paints such that the dried coatings comprise at least 5% by volume of dry polymer solids and the oligomeric ethylene glycol derivative, and 5 to 90% by volume of non-polymeric solids in the form of pigments. The dried coatings can also include additives such as plasticizers, dispersants, surfactants, rheology modifiers, defoamers, thickeners, biocides, mildewcides, colorants, waxes, and the like, that do not evaporate upon drying of the coating composition.

The coating compositions exhibit comparable or improved coalescence compared to otherwise similar compositions that do not have the oligomeric ethylene glycol derivatives described herein, particularly at low temperature. Low temperature coalescence refers to paint application at temperatures near the freezing point of water, typically 35 to 40° F. (1.7 to 4.4° C.). The paint is expected to coalesce and otherwise perform normally at such temperatures.

The coating composition may advantageously be subjected to freeze-thaw cycles using ASTM method D2243-82 without coagulation. Furthermore, the aqueous coating compositions of the invention exhibit good heat storage stability.

The present invention includes a method of preparing a coating composition by mixing together at least one latex polymer, at least one oligomeric ethylene glycol derivative having from 3 to 9 glycol units per oligomer, and water. Pigments may advantageously be added to provide an aqueous latex paint. Advantageously, the latex polymer is in the form of a latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10.

The latex polymer can be used in combination with other ionic or non-ionic type of surfactants that are either polymerizable or non-polymerizable, in the aqueous coating composition. For example, the polymer latex binder can be prepared using emulsion polymerization with an initiator as known in the art, such as ammonium or potassium persulfate, or a redox system that typically includes an oxidant and a reducing agent. Commonly used redox initiation systems are described, e.g., by A. S. Sarac in *Progress in Polymer Science* 24 (1999), 1149-1204.

The composition may be viewed as consisting essentially of at least one oligomeric ethylene glycol derivative, at least one latex binder, and water, wherein the at least one oligomeric ethylene glycol derivative of the coating composition has the structure RO—$(CH_2$—$CH_2$—O—$)_n$—H, wherein R is H or $C_1$-$C_4$ alkyl and preferably H, and n is from 3 to 9, preferably from 3 to 8, and more preferably from 3 to 6. As used herein, the phrase "consisting essentially of" encompasses the latex binder, ethylene glycol derivative, and water in addition to the additives defined herein, but excluding additives that function as a coalescing solvent or freeze-thaw modifier.

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition can be applied to the materials by a variety of techniques well known in the art such as, for example, brush, rollers, mops, air-assisted or airless spray, electrostatic spray, and the like.

It is surprising to find that both coalescing solvents and freeze-thaw stabilizers can be replaced with a single additive, which does not contribute to VOC but which improves scrub resistance, while maintaining freeze-thaw resistance and low temperature cure. In such a case, one of skill in the art would expect a simultaneous reduction in freeze thaw and scrub resistance. Nevertheless, the oligomeric ethylene glycol unexpectedly maintains or improves both freeze-thaw and scrub resistance.

The present invention will now be further described by the following non-limiting examples.

EXAMPLES

Example 1

Demonstration of Low Volatility of Ethylene Glycol Derivatives

An all-acrylic latex was blended with ethylene glycol (EG) or its oligomers diethylene glycol (DEG) or triethylene glycol (TEG) in an amount of 1% by weight based on the total amount of polymer solids. Aliquots of these blends and a latex only control were characterized by a headspace GC method. The following table indicates which substances were studied and the total VOC results are given in ppm in Table 1:

TABLE 1

| Sample | | Headspace TVOC (ppm) | Incremental VOC (ppm) |
|---|---|---|---|
| 1 | Control (Latex Only) | 6790 | |
| 2 | Latex + EG | 15264 | 8474 |
| 3 | Latex + DEG | 10295 | 3505 |
| 4 | Latex + TEG | 6797 | none detected |

The latex only control registered 6790 ppm total VOC. The addition of 1% of ethylene glycol adds 8474 ppm incremental VOC according to the headspace method. As shown above, TEG registers essentially no measurable incremental VOC even with the headspace method.

Example 2

Demonstration of Freeze-Thaw Stability with Ethylene Glycol Oligomer

As shown in this example, the direct replacement of ethylene glycol with the oligomers of the invention produces freeze-thaw stable, essentially zero VOC coatings. The table below shows aqueous latex paint formulations containing different ethylene glycol oligomers according to the invention (1b-1e) and their influence on freeze-thaw stability. Comparison formulations containing either ethylene glycol solvent (1a) or ethoxulated surfactants (1f-1h) at equal weight per volume are also shown in Table 2. The numerical values of the components are provided on a weight basis. The paint formulations each had approximately 46.9% weight solids, 33.8% volume solids, 21.4 PVC, a density of 10.395 lbs/gal, a VOC content with EG of 41.8 g/L and a VOC without EG of 4.3 g/L.

TABLE 2

| | Paint ID | | | | | | | |
|---|---|---|---|---|---|---|---|---|
| | 1 a | 1 b | 1 c | 1 d | 1 e | 1 f | 1 g | 1 h |
| Add while mixing at low shear | | | | | | | | |
| Water | 87.0 | 87.0 | 87.0 | 87.0 | 87.0 | 87.0 | 87.0 | 87.0 |
| Strodex PK 95 Phosphate Ester Surfactant[1] | 2.0 | 2.0 | 2.0 | 2.0 | 2.0 | 2.0 | 2.0 | 2.0 |
| Foamaster SA-3 Mineral Oil-Silicate Defoamer[2] | 2.0 | 2.0 | 2.0 | 2.0 | 2.0 | 2.0 | 2.0 | 2.0 |
| Proxel BD 20 BIT Biocide[3] | 3.0 | 3.0 | 3.0 | 3.0 | 3.0 | 3.0 | 3.0 | 3.0 |
| Tamol 165 Pigment Dispersant[4] | 8.0 | 8.0 | 8.0 | 8.0 | 8.0 | 8.0 | 8.0 | 8.0 |
| AMP 95 Aminopropanol[5] | 1.0 | 1.0 | 1.0 | 1.0 | 1.0 | 1.0 | 1.0 | 1.0 |
| Kronos 4311 Rrutile TiO$_2$ Slurry[6] | 330.0 | 330.0 | 330.0 | 330.0 | 330.0 | 330.0 | 330.0 | 330.0 |
| Attagel ® 50 Attapulgite Clay[7] | 4.0 | 4.0 | 4.0 | 4.0 | 4.0 | 4.0 | 4.0 | 4.0 |
| Aquaflow NHS 300 Non-ionic Associative Thickener[8] | 15.0 | 15.0 | 15.0 | 15.0 | 15.0 | 15.0 | 15.0 | 15.0 |
| Mix 10 minutes @ appx. 1000 RPM | | | | | | | | |
| Water | 130.0 | 130.0 | 130.0 | 130.0 | 130.0 | 130.0 | 130.0 | 130.0 |
| Foamaster SA-3[3] | 2.0 | 2.0 | 2.0 | 2.0 | 2.0 | 2.0 | 2.0 | 2.0 |
| Polymer Dispersion (50% weight solids) | 520.00 | 520.00 | 520.00 | 520.00 | 520.00 | 520.00 | 520.00 | 520.00 |
| Zonyl 9361 Fluorosurfactant[9] | 0.1 | 0.1 | 0.1 | 0.1 | 0.1 | 0.1 | 0.1 | 0.1 |
| Mix 10 minutes @ appx. 1000 RPM | | | | | | | | |
| Ethylene Glycol | 12.0 | | | | | | | |
| DEG (Diethylene glycol)[10] | | 12.0 | | | | | | |
| TEG (Triethylene glycol)[10] | | | 12.0 | | | | | |
| Pluracol ® E200 (Ethylene glycol w/MW = 200, 4.6 moles EO)[11] | | | | 12.0 | | | | |
| Pluracol ® P425 (Ethylene glycol w/MW = 425, 7.6 moles EO)[11] | | | | | 12.0 | | | |
| Pluronic ® F38 (Ethylene Oxide, Propylene Oxide Block Copolymer, HLB 31; MW 4700)[11] | | | | | | 12.0 | | |
| Pluronic ® L35 (Ethylene Oxide, Propylene Oxide Block Copolymer, HLB 19; MW 1900)[11] | | | | | | | 12.0 | |
| Pluronic ® L10 (Ethylene Oxide, Propylene Oxide Block Copolymer, HLB 14; MW 3000)[11] | | | | | | | | 12.0 |
| NHS 300 for ICI adjustment | 14.0 | 10.2 | 14.2 | 12.3 | 17.4 | 11.9 | 23.1 | 18.3 |
| RM 8W HEUR Associative Thickener for KU adjustment | 2.2 | 2.0 | 2.1 | 2.2 | 2.3 | 2.3 | 4.1 | 2.2 |
| Total | 1132.3 | 1128.3 | 1132.4 | 1130.6 | 1135.8 | 1130.3 | 1143.3 | 1136.6 |
| Equilibrated Stormer Viscosity (KU) | 105 | 104 | 104 | 106 | 92 | 93 | 96 | 96 |
| Equilibrated ICI Viscosity (Poise) | 2.4 | 1.6 | 1.5 | 2.6 | 1.8 | 1.6 | 1.4 | 1.6 |
| Freeze-Thaw Stability | | | | | | | | |
| Initial Stormer Viscosity (KU) | 109 | 102 | 104 | 110 | 96 | 97 | 99 | 99 |
| Cycle 1 | 118 | 114 | 117 | 123 | 120 | 117 | 124 | Fail |
| Cycle 2 | 122 | 117 | 120 | 128 | 125 | 113 | Fail | |

TABLE 2-continued

|  | Paint ID | | | | | | | |
|---|---|---|---|---|---|---|---|---|
|  | 1 a | 1 b | 1 c | 1 d | 1 e | 1 f | 1 g | 1 h |
| Cycle 3 | 125 | 124 | 127 | 131 | Fail | 126 | | |
| Cycle 4 | 122 | 126 | 126 | 134 | | Fail | | |

[1] Dexter Chemical Co., Bronx, NY
[2] Cognis Corporation, Ambler, PA
[3] Avecia Biocides, Wilmington, DE
[4] Rohm and Haas Co., Springhouse, PA
[5] Dow Chemical Co., Midland, MI
[6] Kronos Worldwide Inc., Cranberry, NJ
[7] Engelhard Corp., Iselin, NJ
[8] Aqualon Co., Wilmington, DE
[9] E. I. du Pont de Nemours and Company, Wilmington, DE
[10] Equistar, Houston TX
[11] BASF Corp., Florham Park, NJ Removing EG from the paint decreases the VOC content of the paint from about 42 g/l to about 4 g/l. The remaining VOC comes primarily from AMP 95, amino methyl propanol, which is used to adjust paint pH. Removing AMP 95 drops the VOC level to about 1 g/l. Any remaining VOC comes from the VOC content of other additives such as surfactants, dispersants and defoamers, so removal of the EG represents removal of essentially all volatile freeze-thaw enhancer. The paint is already formulated such that it is devoid of volatile coalescing solvent.

The freeze-thaw data clearly indicate that replacement of EG with non volatile EG oligomers such as TEG and Pluracol® E200 results in essentially equivalent freeze-thaw stability as measured by the rise in Stormer Viscosity. Longer oligomers (Pluracol® P425, sample 1e) and ethoxylated surfactants (Pluronic® grades, samples 1f-1h) are not quite as efficient freeze-thaw stabilizers, since complete coagulation occurs leaving it unusable (denoted by a fail rating). The Pluronic® grades, which are block copolymers of propylene oxide and ethylene oxide, were not as effective as the oligomers of the invention.

Example 3

Demonstration of Freeze-Thaw Resistance and Scrub Resistance with Ethylene Glycol Oligomer Paints were made using the same formula as Table 2 without coalescing solvent. A control paint containing 12 lb/100 gal ethylene glycol (sample 1) was made and compared to paints containing equal weight percentages of either low molecular weight oligomers of EG (samples 2-4) or Pluronic® surfactant (sample 5).

The data in the Table 3 below clearly show that tri-ethylene glycol (TEG) and Pluracol® E200 and P425 lead to scrub improvements. TEG and Pluracol® E200 do this while maintaining freeze-thaw resistance, but Pluracol® P425 is not capable of maintaining freeze-thaw stability. The surfactant Pluronic® F38 (a block copolymer of propylene oxide and ethylene oxide), which was included for comparison, does promote freeze-thaw stability but does so at the expense of scrub resistance as in the prior art. Flow and leveling, sag resistance, gloss, contrast ratio, blister resistance, wet and dry adhesion to alkyd, and block resistance are unchanged upon replacement of ethylene glycol with the oligomers, TEG and E 200. However, Pluracol® P425 leads to unacceptable blocking resistance and both Pluracol® P425 and Pluronic® F38 cause unacceptable sagging of the paint.

TABLE 3

|  |  | Paint ID | | | | |
|---|---|---|---|---|---|---|
|  |  | 1 | 2 | 3 Variation | 4 | 5 |
|  |  | EG | TEG | E200 | P425 | F38 |
| Stormer Viscosity | KU | 104 | 103 | 99 | 98 | 98 |
| ICI Viscosity | Poise | 1.8 | 1.8 | 1.7 | 1.5 | 1.8 |
| NYPC Leveling |  | 5 | 5 | 6 | 6 | 5 |
| Leneta Sag Resistance | Mils | 12 | 12 | 12 | 10 | 10 |
| 20° Gloss on Paper (24 hr) |  | 21.6 | 23.3 | 22.8 | 24.3 | 22.8 |
| 60° Gloss on Paper (24 hr) | % | 56.6 | 58.3 | 57.5 | 58.5 | 58.1 |
| Contrast Ratio | % | 97.68% | 97.81% | 97.83% | 97.80% | 97.43% |
| Low Temperature Coalescence 42 +/− 2° F.; Rating 1–10, 10 = Best |  |  |  |  |  |  |
| Unsealed white/black, Sealed white/black |  | 10 | 10 | 10 | 10 | 10 |
| Early Blister Resistance on air dried green alkyd |  |  |  |  |  |  |
| 4 hour cure rating |  | 10 | 10 | 10 | 10 | 10 |
| 24 hour cure rating |  | 10 | 10 | 10 | 10 | 10 |
| Surfactant Leaching |  |  |  |  |  |  |
| Rating 1–10, 10 = Best |  | 7 | 6 | 7 | 7 | 7 |
| Wet Adhesion Scrub- Green alkyd | # of cycles | 2000 | 2000 | 2000 | 2000 | 2000 |
| on air-dried alkyds | % remaining | 100% | 97% | 100% | 100% | 100% |

TABLE 3-continued

|  |  | Paint ID | | | | |
|---|---|---|---|---|---|---|
|  |  | 1 | 2 | 3 | 4 | 5 |
|  |  |  |  | Variation | | |
|  |  | EG | TEG | E200 | P425 | F38 |
| Wet Adhesion Scrub- Blue alkyd | # of cycles | 2000 | 2000 | 2000 | 2000 | 2000 |
| On air-dried alkyds | % remaining | 100% | 100% | 100% | 100% | 97% (ST) |
| Dry Adhesion- Green Alkyd 24 h-3 d |  | 5-5 | 5-5 | 5-5 | 5-5 | 5-5 |
| Dry Adhesion- Blue Alkyd 24 h-3 d |  | 5-5 | 5-5 | 5-5 | 5-5 | 5-5 |
| Paper Block (24 Hr Cure) | 500 g 30 min @ 50 C. | 6, 6, 5 | 5, 5, 5 | 5, 6, 5 | 4, 4, 3 | 5, 5, 6 |
|  | 500 g 1 hr @ 50 C. | 5, 5, 5 | 5, 5, 4 | 4, 5, 4 | 0, 0, 0 | 5, 5, 4 |
|  | 1000 g 24 hr @ RT | 7, 8, 8 | 5, 5, 5 | 5, 5, 6 | 4, 4, 3 | 7, 6, 6 |
| Freeze-thaw Stability | Initial KU | 105 | 104 | 100 | 97 | 98 |
|  | Cycle 1 | 118 | 123 | 118 | 123 | 121 |
|  | Cycle 2 | 127 | 133 | 130 | FAIL | 124 |
|  | Cycle 3 | 123 | 123 | 127 |  | 122 |
|  | Cycle 4 | 127 | 134 | 130 |  | 123 |
| Heat Stability (10 d @ 60° C.) | Initial KU | 105 | 104 | 100 | 97 | 98 |
|  | KU 10 Day | 102 | 113 | 100 | 84 | 102 |
|  | KU Difference | −3 | 9 | 0 | −1.3 | 4 |
| Syneresis | Mm | 1.5 | 0.5 | 1.5 | 1.5 | 0.0 |
| Scrub resistance 7 d cure | avg. of 2 | 1278 | 2099 | 1411 | 1486 | 1015 |

To confirm the efficacy of the oligomers after storage, paint samples were stored at 50° C. for two weeks and then subjected to freeze-thaw cycling. The data in Table 4 below, produced using ASTM Method D2243-82, indicate that the TEG and Pluracol® E200 samples are able to withstand several cycles of freeze-thaw.

TABLE 4

|  |  | Paint ID | | |
|---|---|---|---|---|
|  |  | 1 | 2 | 3 |
|  |  |  | Variation | |
|  |  | EG | TEG | E200 |
| Stormer Viscosity | KU | 104 | 103 | 99 |
| ICI Viscosity | Poise | 1.8 | 1.8 | 1.7 |
| Freeze-thaw Stability | Initial KU | 105 | 104 | 100 |
|  | Cycle 1 | 118 | 123 | 118 |
|  | Cycle 2 | 127 | 133 | 130 |
|  | Cycle 3 | 123 | 123 | 127 |
|  | Cycle 4 | 127 | 134 | 130 |
|  | Cycle 5 | 126 | 140 | 133 |
| Freeze-thaw Stability | Initial KU | 104 | 111 | 99 |
| Retested on paints | Cycle 1 | 120 | 134 | 113 |
| stored @ 50° C. 14 d | Cycle 2 | 121 | 136 | 122 |
|  | Cycle 3 | 125 | 141 | 124 |

It is understood that upon reading the above description of the present invention, one skilled in the art could make changes and variations therefrom. These changes and variations are included in the spirit and scope of the following appended claims.

That which is claimed:

1. An aqueous coating composition, comprising:
(a) at least one oligomeric ethylene glycol derivative having the following structure:

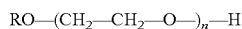

RO—(CH$_2$—CH$_2$—O—)$_n$—H wherein R is H or C$_1$-C$_4$ alkyl and n is from 3 to 9;
(b) at least one latex emulsion polymer selected from the group consisting of pure acrylics, styrene acrylics, vinyl acrylics, acrylated ethylene vinyl acetate copolymers, and mixtures thereof; and
(c) water,
wherein the at least one oligomeric ethylene glycol derivative is present in an amount of 2 wt % to 10 wt %, based on the dry weight of the at least one latex emulsion polymer.

2. The composition according to claim 1, further comprising at least one inorganic pigment.

3. The composition according to claim 2, wherein the inorganic pigment is selected from the group consisting of TiO$_2$, clay, CaCO$_3$, talc, barytes, zinc oxide, zinc sulfite, and mixtures thereof.

4. The composition according to claim 1, where R is H.

5. The composition according to claim 1, wherein n is from 3 to 8.

6. The composition according to claim 1, wherein n is from 3 to 6.

7. The composition according to claim 6, where R is H.

8. The composition according to claim 1, wherein the at least one latex emulsion polymer is derived from at least one acrylic monomer selected from the group consisting of acrylic acid, acrylic acid esters, methacrylic acids, methacrylic acid esters, and mixtures thereof.

9. The composition according to claim 8, wherein the at least one latex polymer is further derived from one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, ethylene, C4-C8 conjugated dienes, and mixtures thereof.

10. The composition according to claim 1, comprising less than 250 g/l of volatile organic compounds (VOC's).

11. The composition according to claim 10, comprising less than 100 g/l VOC's.

12. The composition according to claim 10, comprising less than 50 g/l VOC's.

13. The composition according to claim 10, comprising less than 10 g/l VOC's.

14. The composition according to claim 1, further comprising one or more additives selected from the group consisting of plasticizers, drying retarders, dispersants, surfactants or wetting agents, rheology modifiers, defoamers, thickeners, biocides, mildewcides, colorants, waxes, perfumes and co-solvents, and mixtures thereof.

15. A latex paint composition, comprising:
   (a) at least one oligomeric ethylene glycol derivative having the following structure:

$$RO-(CH_2-CH_2-O-)_n-H$$

wherein R is H or $C_1$-$C_4$ alkyl and n is from 3 to 9;
   (b) at least one latex emulsion polymer;
   (c) at least one inorganic pigment; and,
   (d) water,
   wherein the at least one oligomeric ethylene glycol derivative is present in an amount of 2 wt % to 10 wt %, based on the dry weight of the at least one latex emulsion polymer.

16. The paint composition according to claim 15, wherein the latex emulsion polymer is an acrylic latex polymer.

17. The paint composition according to claim 16, wherein the latex emulsion polymer is a butyl acrylate/methyl methacrylate copolymer.

18. The paint composition according to claim 15, where R is H.

19. The paint composition according to claim 15, wherein n is from 3 to 6.

20. The paint composition according to claim 15, comprising less than 50 g/l of volatile organic compounds (VOC's).

21. The paint composition according to claim 20, comprising substantially no VOC's.

22. A VOC-free aqueous coating composition, consisting essentially of low-volatility components, comprising:
   (a) at least one oligomeric ethylene glycol derivative having the following structure:

$$RO-(CH_2-CH_2-O-)_n-H$$

wherein R is H or $C_1$-$C_4$ alkyl and n is from 3 to 9;
   (b) at least one latex emulsion polymer selected from the group consisting of pure acrylics, styrene acrylics, vinyl acrylics, acrylated ethylene vinyl acetate copolymers, and mixtures thereof;
   (c) optionally at least one inorganic pigment;
   (d) optionally one or more additives; and
   (e) water,
   wherein the at least one oligomeric ethylene glycol derivative is present in an amount of 2 wt % to 10 wt %, based on the dry weight of the at least one latex emulsion polymer.

23. The composition according to claim 22, where R is H.

24. The composition according to claim 22, wherein n is from 3 to 6.

25. An aqueous coating composition, comprising
   at least one oligomeric ethylene glycol derivative having the following structure:

$$RO-(CH_2-CH_2-O-)_n-H$$

wherein R is H or $C_1$-$C_4$ alkyl and n is from 3 to 9;
   at least one latex polymer; and
   water;
   wherein the at least one oligomeric ethylene glycol derivative is present in an amount of 2 wt % to 10 wt %, based on the dry weight of the at least one latex emulsion polymer and said composition is substantially free of additional coalescing solvents and freeze-thaw stabilizers.

26. The composition according to claim 25, where R is H.

27. The composition according to claim 25, wherein n is from 3 to 6.

28. A coated substrate comprising
   a substrate; and
   a dried coating composition coated upon the substrate, said dried coating comprising at least one oligomeric ethylene glycol derivative having the structure RO—($CH_2$—$CH_2$—O—)$_n$—H wherein R is H or $C_1$-$C_4$ alkyl and n is from 3 to 9, and at least one emulsion polymer latex binder, wherein the at least one oligomeric ethylene glycol derivative is present in an amount of 2 wt % to 10 wt %, based on the dry weight of the at least one emulsion polymer latex binder.

29. The coated substrate according to claim 28, where R is H.

30. The coated substrate according to claim 28, wherein n is from 3 to 6.

31. A method of preparing an aqueous coating composition, comprising the step of:
   preparing an emulsion polymer latex binder selected from the group consisting of pure acrylics, styrene acrylics, vinyl acrylics, acrylated ethylene vinyl acetate copolymers, and mixtures thereof using emulsion polymerization; and
   combining the binder with an ethylene glycol derivative having the following structure:

$$RO-(CH_2-CH_2-O-)_n-H$$

wherein R is H or $C_1$-$C_4$ alkyl and n is from 3 to 9, to form an aqueous composition, wherein the at least one oligomeric ethylene glycol derivative is present in an amount of 2 wt % to 10 wt %, based on the dry weight of the at least one latex emulsion polymer.

32. The method according to claim 31, wherein said mixing step comprises mixing at least one ethylene glycol derivative wherein R is H.

33. The method according to claim 31, wherein said mixing step comprises mixing at least one ethylene glycol derivative wherein n is from 3 to 6.

34. The method according to claim 31, further comprising the step of adding at least one pigment to the aqueous composition.

35. The coated substrate according to claim 28, wherein the at least one emulsion polymer latex binder is selected from the group consisting of pure acrylics, styrene acrylics, vinyl acrylics, acrylated ethylene vinyl acetate copolymers, and mixtures thereof.

36. The composition according to claim 1, wherein the emulsion polymer is derived from monomers selected from the group consisting of acrylic acid, acrylic acid esters, methacrylic acid, methacrylic acid esters, styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, $C_4$-$C_8$ conjugated dienes, isoprene, and chloroprene.

37. The composition according to claim 1, wherein the at least one oligomeric ethylene glycol derivative is present in an amount of 2 wt % to 8 wt %, based on the dry weight of the at least one latex emulsion polymer.

38. The composition according to claim 1, wherein the at least one oligomeric ethylene glycol derivative is present in an amount of 3 wt % to 7 wt %, based on the dry weight of the at least one latex emulsion polymer.

39. The composition according to claim 25, further comprising at least one inorganic pigment.

* * * * *